US012652642B2

(12) United States Patent
Zhou et al.

(10) Patent No.: US 12,652,642 B2
(45) Date of Patent: Jun. 9, 2026

(54) METHOD AND APPARATUS FOR CARRIER-PHASE POSITIONING WITH MULTIPLE FREQUENCIES

(71) Applicant: Samsung Electronics Co., Ltd., Gyeonggi-do (KR)

(72) Inventors: Yuhan Zhou, San Diego, CA (US); Philippe Jean Marc Michel Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 404 days.

(21) Appl. No.: 18/098,336

(22) Filed: Jan. 18, 2023

(65) Prior Publication Data

US 2023/0284177 A1     Sep. 7, 2023

Related U.S. Application Data

(60) Provisional application No. 63/397,056, filed on Aug. 11, 2022, provisional application No. 63/394,158, filed on Aug. 1, 2022, provisional application No. 63/313,100, filed on Feb. 23, 2022, provisional application No. 63/307,848, filed on Feb. 8, 2022.

(51) Int. Cl.
| | |
|---|---|
| *H04W 64/00* | (2009.01) |
| *H04L 5/00* | (2006.01) |
| *H04W 56/00* | (2009.01) |
| *H04W 72/0453* | (2023.01) |

(52) U.S. Cl.
CPC ......... *H04W 64/003* (2013.01); *H04L 5/0048* (2013.01); *H04W 56/0035* (2013.01); *H04W 72/0453* (2013.01)

(58) Field of Classification Search
CPC ........... H04W 64/003; H04W 56/0035; H04W 72/0453; H04W 64/00; H04W 24/08; H04L 5/0048; G01S 5/0268; G01S 19/43
See application file for complete search history.

(56) References Cited

U.S. PATENT DOCUMENTS

| | | | |
|---|---|---|---|
| 7,633,437 B2 | 12/2009 | Hatch | |
| 10,045,324 B2 | 8/2018 | Zaidi et al. | |
| 2022/0078744 A1 | 3/2022 | Manolakos et al. | |
| 2022/0113364 A1 | 4/2022 | Zhou et al. | |
| 2022/0252690 A1 | 8/2022 | Zhou et al. | |
| 2023/0046045 A1* | 2/2023 | Bao ..................... | H04W 64/006 |
| 2023/0076490 A1* | 3/2023 | Bao ..................... | H04W 64/003 |
| 2023/0254110 A1* | 8/2023 | Kratz ................... | H04L 7/0016 |
| | | | 375/368 |
| 2023/0262646 A1* | 8/2023 | Li ......................... | H04W 24/10 |
| | | | 370/329 |
| 2023/0370221 A1* | 11/2023 | Schaepperle ......... | H04L 5/0048 |
| 2024/0385276 A1* | 11/2024 | Liu ........................ | H04W 4/02 |
| 2025/0056514 A1* | 2/2025 | Manolakos ........... | H04L 5/0048 |
| 2025/0063575 A1* | 2/2025 | Mohammad Soleymani ............. | |
| | | | G01S 11/02 |

\* cited by examiner

*Primary Examiner* — Kenneth T Lam

(74) *Attorney, Agent, or Firm* — The Farrell Law Firm, P.C.

(57) ABSTRACT

A system and a method are provided in which a user equipment (UE) in a network measures a first carrier phase based on a first reference signal at a first frequency, and a second carrier phase based on a second reference signal at a second frequency that is different from the first frequency. The UE performs a measurement based on the first carrier phase and the second carrier phase. The UE reports the measurement to a location management function (LMF) of the network.

19 Claims, 6 Drawing Sheets

202

204

302 — Determine initial positioning

304 — Indicate F-CPM UE capability

306 — Receive measurement configuration

308 — Receive measurement command

310 — Receive RSs for measurement

312 — Perform phase difference measurement

314 — Report the phase difference

402 — Determine initial positioning

404 — Indicate F-CPM UE capability

406 — Receive measurement configuration

408 — Receive measurement command

410 — Transmit RS at first frequency

412 — Receive RS at second frequency

414 — Measure phase difference

416 — Report the phase difference

METHOD AND APPARATUS FOR CARRIER-PHASE POSITIONING WITH MULTIPLE FREQUENCIES

CROSS-REFERENCE TO RELATED APPLICATIONS

This application claims the priority benefit under 35 U.S.C. § 119(e) of U.S. Provisional Application Nos. 63/307,848, 63/313,100, 63/394,158, and 63/397,056, filed on Feb. 8, 2022, Feb. 23, 2022, Aug. 1, 2022, and Aug. 11, 2022, respectively, the disclosures of which are incorporated by reference in their entirety as if fully set forth herein.

TECHNICAL FIELD

The disclosure generally relates to new radio (NR) positioning. More particularly, the subject matter disclosed herein relates to improvements to NR positioning using carrier phase measurements.

SUMMARY

Positioning for NR was standardized in $3^{rd}$ Generation Partnership Project (3GPP) Release (Rel)-16/17, and is able to outperform long term evolution (LTE) positioning due its use of larger frequencies. The standardization of positioning in 3GPP Rel-18 may provide improved accuracy based on NR carrier phase measurements.

Carrier phase measurements may improve positioning accuracy by performing phase measurements instead of, for example, time measurements. The carrier phase is a function of the signal propagation time from a transmit (Tx) antenna reference point of a transmitter to a receive (Rx) antenna reference point of a receiver. Carrier phase measurements may be implemented in an analog domain or a digital domain.

Reference signals that are required for carrier phase positioning need not be wideband, thereby reducing overhead. However, the phase measurements may contain an unknown number of multiples of carrier wavelength (i.e., integer ambiguity). Further, the phase measurement accuracy may be impacted when there are random phase shifts (i.e., phase noise) in the phase measurement. The phase noise must be effectively mitigated for highly accurate phase measurements.

To solve these problems other positioning methods (e.g., time difference on arrival (TDOA)) may be relied on to resolve the integer ambiguity. For example, a user equipment (UE) may first determine an approximate location with TDOA, and then refine the position using carrier phase positioning. Alternatively, fixed known locations may also be used to calibrate the location.

One issue with the above approach is that the integer ambiguity can be resolved only if a positioning accuracy of the TDOA is within one wavelength. Specifically, carrier phase measurements cannot be differentiated when there is a $2\pi$ difference between signals. Further, carrier phase positioning must be performed often so that it does not introduce a new integer ambiguity. Finally, the use of fixed known locations is not scalable.

To overcome these issues, systems and methods are described herein for performing NR positioning using carrier phase measurements. A procedure and signaling are provided for carrier phase measurements with multiple frequencies/carriers for resolving integer ambiguity. A procedure and signaling for carrier phase positioning is also provided having multiple receive (Rx)/transmit (Tx) antennas for measuring the angle of arrival (AoA) and/or angle of departure (AoD).

The above approaches improve on previous methods because they provide solutions for carrier phase positioning with multiple frequencies, and can improve accuracy for NR positioning.

In an embodiment, a method is provided in which a UE in a network measures a first carrier phase based on a first reference signal at a first frequency, and a second carrier phase based on a second reference signal at a second frequency that is different from the first frequency. The UE performs a measurement based on the first carrier phase and the second carrier phase. The UE reports the measurement to a location management function (LMF) of the network.

In an embodiment, a UE in a network is provided that includes a processor and a non-transitory computer readable storage medium storing instructions. When executed, the instructions cause the processor to measure a first carrier phase based on a first reference signal at a first frequency, and a second carrier phase based on a second reference signal at a second frequency that is different from the first frequency, perform a measurement based on the first carrier phase and the second carrier phase, and report the measurement to an LMF of the network.

In an embodiment, a system includes a UE configured to perform a measurement based on carrier phases from reference signals at different frequencies, and report the measurement. The system also includes an LMF configured to receive the measurement and determine a location of the UE.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
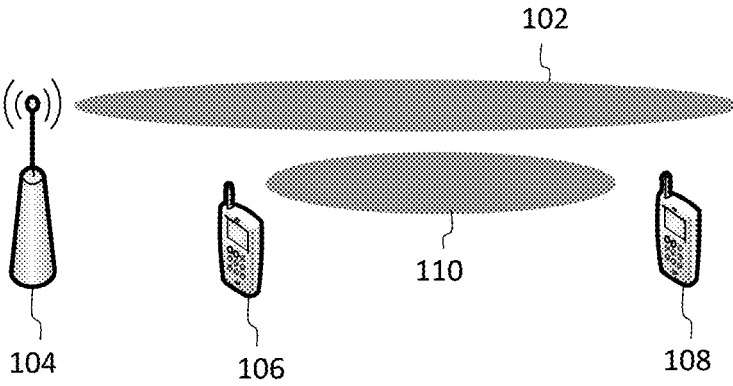
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/ or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station or a gNode B (gNB) 104, a first UE 106, and a second UE 108. A data path 110 may enable the transmission of data (and some control information) on a sidelink between the first UE 106 and the second UE 108. The control path 102 and the data path 110 may be on the same frequency or may be on different frequencies.

An NR carrier phase measurement between a transmitter i and a receiver a is set forth below in Equation (1).

$$\lambda(\phi(t) + N) = d(t) + c\big(\delta t^i(t) - \delta t_a(t)\big) + \lambda\big(\varphi^i(t_0) - \varphi_a(t_0)\big) + w_{i,\varphi}^a(t) \qquad (1)$$

In Equation (1), $\phi(t)$ is the carrier phase measurement at time t (cycles), d(t) is the geometric distance between a transmitter antenna of transmitter i and a receiver antenna of receiver a (meters), N is an unknown integer ambiguity, $\delta t^i(t)$, $\delta t_a(t)$ are the clock errors of the transmitter i and the receiver a, respectively, (meters), $\varphi^i(t_0)$ and $\varphi_a(t_0)$ are the phase offsets caused by initial phase offsets of the of the transmitter i and the receiver a at initial time $t_0$, respectively, (meters), c is the speed of light (meters/second), $\lambda$ is the wavelength of the carrier frequency (meters), and $$w_{i,\varphi}^a(t)$$

is the carrier phase measurement error, which may include the measurement errors due to multipath, phase noise, etc. (meters).

Figure 2:
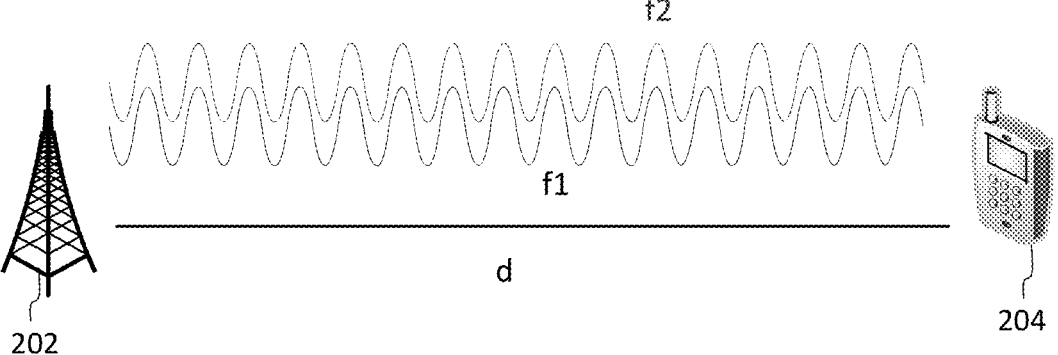
FIG. 2 is a diagram illustrating a frequency-based carrier phase measurement (F-CPM) method performed using two frequencies, according to an embodiment.

FIG. 2 is a diagram illustrating an F-CPM method performed using two frequencies, according to an embodiment. A transmitter (e.g., a base station, a gNB, or a transmitting UE in a sidelink) 202 may send two reference signals at two different frequencies, $f_1$ and $f_2$, to a receiver (e.g., a receiving UE) 204.

For a given distance d between the transmitter 202 and the receiver 204, the measured carrier phases for these two frequencies are set forth in Equations (2) and (3) below.

$$\frac{df_1}{c} = N_1 + \frac{\varphi_1}{2\pi} \tag{2}$$

$$\frac{df_2}{c} = N_2 + \frac{\varphi_2}{2\pi} \tag{3}$$

The phase difference $\Delta\varphi$ of the two measurements at frequencies $f_1$ and $f_2$ for the given distance d is set forth in Equation (4) below.

$$\Delta\varphi = 2\pi \cdot \left[\frac{d}{c}(f_2 - f_1) + (N_2 - N_1)\right] \tag{4}$$

Based on Equation (4), positioning using F-CPM may be performed at the receiver 204. First, the UE 204 determines its position using an existing positioning technique (e.g., TDOA or multi-round-trip time (RTT) methods). Second, at this location, the UE 204 determines integer ambiguity values $N_2$ and $N_1$. Third, the UE 204 tracks the phase difference and thus, can determine its reference location. A similar method may be used at the transmitter 202 and is described in greater detail below with respect to FIG. 4.

The above-described method may provide improved accuracy in that the impact of phase error is more limited with two measurements at two different frequencies (due to the differential) than it is with respect to F-CPM at a single frequency.

Positioning error is inversely proportional to the frequency difference. Specifically, the larger the frequency difference $f_1-f_2$, the higher accuracy that can be achieved. A detailed relationship between the differences of the two frequencies $f_1-f_2$ and the positioning accuracy is shown in Table 1 below.

TABLE 1

|  | Accuracy = 0.1 m | Accuracy = 1 m | Accuracy = 10 m |
|---|---|---|---|
| High phase accuracy (0.02π radians) | ≥100 MHz | ≥10 MHz | ≥1 MHz |
| Low phase accuracy (0.2π radians) | ≥1 GHz | ≥100 MHz | ≥10 MHz |

If $f_1$ and $f_2$ are within the same band, the max value off $f_1-f_2$ is 70 MHz for a licensed band in frequency range-1 (FR1) (i.e., n47), and 1.2 GHz for an unlicensed band in frequency range-2 (FR2) (i.e., n96) for sidelink positioning. Thus, to achieve high accuracy of 0.1 meter (m) for sidelink positioning, the transmitter and receiver can operate in unlicensed FR1 bands if the two frequencies $f_1$ and $f_2$ are in the same band or in licensed FR1 bands if the two frequencies $f_1$ and $f_2$ are in different bands (i.e., one frequency in n38 and the other frequency is in n47).

Phase noise power may decrease as a frequency offset to a center frequency increases. For example, $f_1$ may be chosen as a lowest frequency in a supported band and $f_2$ may be chosen as a highest frequency in the same band. In another example, $f_1$ may be a lowest frequency in one band and $f_2$ may be a highest frequency in another band.

Accordingly, in performing carrier phase measurement at the receiver, a transmitter may send the two different waves simultaneously (e.g., pure sine waves or other signals) with a same initial carrier phase at different frequencies. The receiver measures the phase difference between the two received waves. The relative distance d between the transmitter and the receiver is given in Equation (5) below.

$$d = \frac{c \cdot \left(\frac{\Delta\varphi}{2\pi} + \Delta N\right)}{f_1 - f_2} \tag{5}$$

In Equation (5), $f_1$ and $f_2$ are two frequencies for signal transmission, and $\Delta\varphi$ is the phase difference measured at the receiver. The remaining integer ambiguity $\Delta N$ can be resolved by providing the range of the estimated receiver location. For example, if an LMF (i.e., a network entity supporting location determination of a UE) can provide the range of the receiver location based on a 3GPP Rel-17 positioning method and with a frequency difference $f_1-f_2<1.8$ GHz, the $\Delta N$ can be uniquely determined. Further, the relationship between the phase accuracy and a gap of the two frequencies shown in Table 1 applies.

If the LMF performs a 3GPP Rel-17 positioning method to first estimate a location of the receiver, the positioning accuracy may be within 1 m for general commercial use cases in 3GPP Technical Specification (TS) 22.261. The estimated distance given by the 3GPP Rel-17 positioning method may be d∈ ($d_0-1$, $d_0+1$), where $d_0$ is expected value of d provided by the LMF. If the frequency difference $f_1-f_2<900$ MHz, the remaining integer ambiguity $\Delta N$ can be uniquely determined. The integer ambiguity can be effectively mitigated if the UE can obtain a location estimation.

While the transmitted signals are described as sine waves above, existing 3GPP Rel-17 wideband reference signals (RSs) for positioning (i.e., positioning RSs (PRSs)/sounding RSs (SRSs)) may be reused with a different resource configuration in a time-frequency domain for carrier phase measurement. A carrier phase reference signal (C-PRS) may be designed as a pure sine signal with very small bandwidth. In the frequency domain, the C-PRS may only occupy one resource element (RE), and in the time domain, the C-PRS may be continuous over several symbols. When the C-PRS is designed for a single UE, C-PRS resources may be allocated at edges of bandwidth parts (BWPs) that the UE can support. However, in order to support UE multiplexing, the C-PRS may be allocated in a resource grid for every $K_{C\text{-}PRS}$ subcarrier spacing.

A starting symbol of the C-PRS within a reference slot may be $1 \leq l_{start} \leq 14$. A size of C-PRS resource allocation in the time domain may be $l_{C\text{-}PRS}$ consecutive symbols, $1 \leq l_{C\text{-}PRS} \leq 14$. A frequency density of the C-PRS is $K_{C\text{-}PRS}$ (i.e., the gap between adjacent two C-PRS resources in frequency domain is $K_{C\text{-}PRS}$ REs). These parameters can be configured by higher layer signaling, such as, for example, radio resource control (RRC) or LTE positioning protocol (LPP) signaling.

Thus, according to an embodiment, for an F-CPM method at a receiver (e.g., a receiving UE), after an initial location is established, the receiver measures the carrier phase difference of two received reference signals at two different frequencies. An existing PRS or SRS may also be used as a reference signal for carrier phase measurement. The two frequencies may be within a same band or different bands depending on a positioning accuracy requirement.

Figure 3:
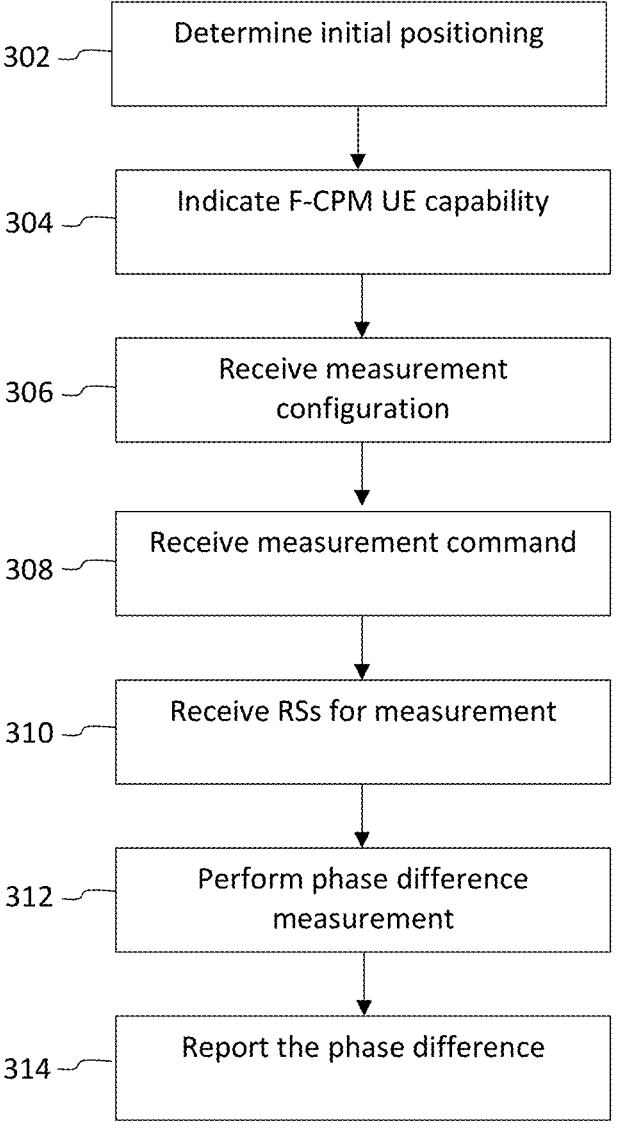
FIG. 3 is a flowchart illustrating a method for carrier phase positioning at a receiver, according to an embodiment.

FIG. 3 is a flowchart illustrating a method for carrier phase positioning at a receiver, according to an embodiment.

At 302, the receiver (e.g., the receiving UE) determines its initial position using a positioning technique, such as, for example, TDOA.

At 304, the receiver (e.g., receiving UE) indicates its F-CPM capability to an LMF. During a capability exchange, the receiver indicates to the LMF whether it supports F-CPM measurements. The receiver may also indicate to the LMF a maximum frequency difference it can support for phase measurements. As described above, accuracy increases as the two frequencies are spaced further apart. The receiver may perform the phase measurement at two frequencies with a same oscillator to ensure that there is no phase offset aside from that which is due to the frequency difference. The receiver may also report the phase measurement accuracy it is able to support to the LMF.

For two tone measurements, the transmitter and receiver may require at least two phase-locked loops (PLLs), and the phase offset difference between the two PLLs should be constant. The two frequencies may be within a same BWP and the maximum frequency gap that can be supported by the receiver may be as large as the receiver-supported bandwidth. The receiver capability may indicate a maximum frequency spacing that can be supported with a same phase reference.

For measurement using a wideband RS, the receiver may measure the PRS/SRS across the supported BWP. Given that the BWP bandwidth is limited to 100 MHz in FR1 and 400 MHz in FR2, for high accuracy positioning, the receiver may need to operate at two or more BWPs for carrier phase measurement at different frequencies. The receiver may also operate with a single BWP (e.g., on two different carriers). The receiver may indicate the maximum frequency bandwidth on which it can measure two different phases while still using the same phase reference.

At 306, the receiver receives a measurement configuration via higher layer signaling. RRC or LPP signaling may be used to indicate the measurement configuration. For two tone measurements, a measurement configuration message may include the two frequencies to be used for phase measurements. The measurement configuration message may also include a phase measurement accuracy if the receiver is able to support multiple phase measurement precisions.

For measurement using the wideband RS, the message may include the frequency and time resource allocation for PRS and/or the phase measurement accuracy if the receiver can support multiple phase measurement precisions.

At 308, the receiver receives a measurement command via higher layer signaling. The measurement command may be received by RRC or LPP signaling with a configured measurement gap. A medium access control (MAC) control element (CE) may be used for measurement gap activation and deactivation for low latency. Alternatively, the measurement trigger can be included in downlink control information (DCI). For both the wideband RS and the two tone measurements, the measurement command can be included in an information element (IE) RequestLocationInformation, if LPP signaling is used.

At 310, the receiver receives RSs at two different frequencies from the transmitter. At 312, the receiver measures the carrier phases of the received RSs and the resulting phase difference between the received RSs, which is described in greater detail above with respect to FIG. 2.

At 314, the receiver reports the measured phase difference to the LMF. The receiver may either report the phase difference and/or compute and report a distance between the transmitter and the receiver. However, it may not be enough to only report the distance. For example, if the receiver performs triangulation/trilateration, reporting only the distance may be enough, but distance measurements from multiple transmitters (e.g., gNBs) may be necessary. The receiver may also measure and report from a single node (e.g., a gNB or a UE on the sidelink). In this case, the receiver can compute the angle of arrival as described in greater detail below with respect to FIG. 5, and report both the angle and distance (or phase).

Thus, according to an embodiment, for a carrier phase measurement method at the receiver using two frequencies, the receiver may indicate a maximum frequency difference it can support, and the receiver may report the phase measurement accuracy it can support. The receiver may indicate the carrier phase measurement method (e.g., two tone measurement or measurement with wideband RS) it can support. The receiver may operate at two or more BWPs for the carrier phase measurement when measurement with wideband RS is used.

In performing carrier phase measurement at the transmitter, a phase difference between a transmitted signal and a received signal may be used to estimate distance. More specifically, the transmitter (e.g., a gNB or a transmitting UE in a sidelink transmission) can transmit either a sine wave signal or a wideband signal PRS. The receiver (e.g., the receiving UE) locks a local oscillator to the incoming signal and retransmits it. The transmitter measures the phase delay of the received signal compared with the transmitted signal and calculates the distance as shown in Equation (6) below.

$$\frac{\lambda}{2}\left(N + \frac{\varphi}{2\pi}\right) = d \tag{6}$$

In Equation (6), $\lambda$ is the wavelength, $\varphi$ is the phase delay, and N is an integer. Since the range of the phase measurement is between 0 and $2\pi$, it may be necessary to recognize the past number of whole cycles N in order to determine a one-way distance greater than $\lambda/2$. The ambiguity can be eliminated by sending two tones and measuring the difference between their received delay phases. Substituting frequency for wavelength results in Equation (7) below.

$$\begin{cases} \varphi_1 = 2\pi\left(\frac{2df_1}{c} - N_1\right) \\ \varphi_2 = 2\pi\left(\frac{2df_2}{c} - N_2\right) \end{cases} \tag{7}$$

The relative distance d is set forth in Equation (8) below.

$$d = \frac{c}{2} \times \frac{\frac{\varphi_1 - \varphi_2}{2\pi} + \Delta N}{f_1 - f_2} \tag{8}$$

In Equation (8), $\Delta N = N_1 - N_2$ is the remaining integer ambiguity that may be resolved by the side information provided by the LMF, or whenever the UE knows its location.

Figure 4:
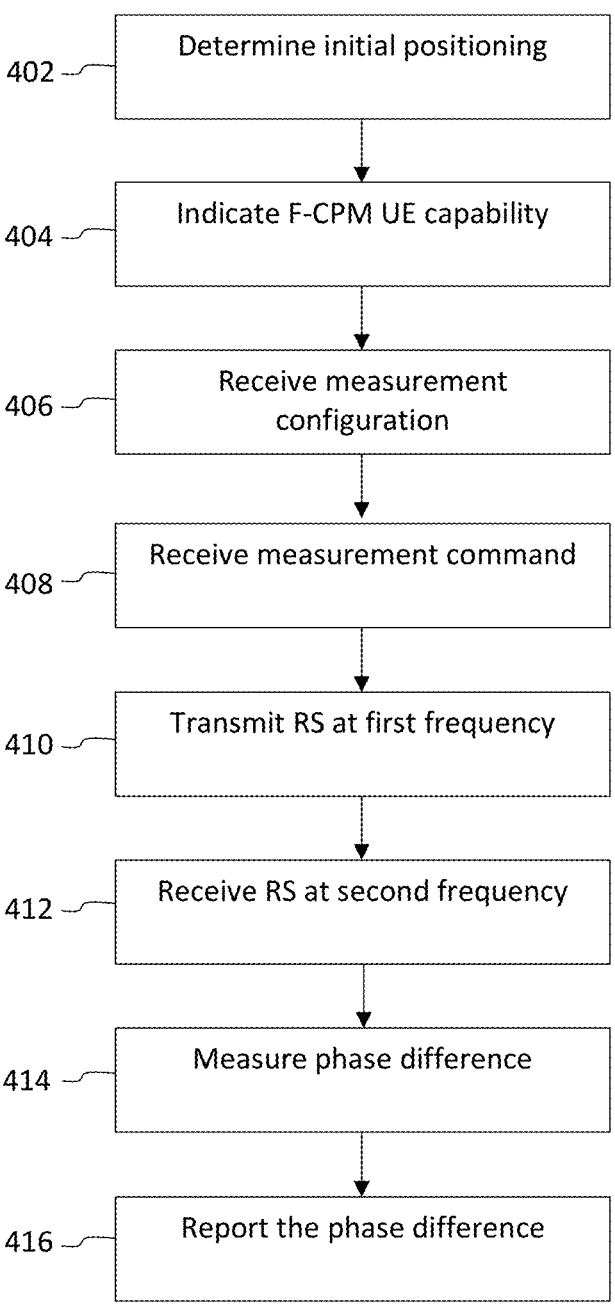
FIG. 4 is a flowchart illustrating a method for carrier phase positioning at A transmitter, according to an embodiment.

FIG. 4 is a flowchart illustrating a method for carrier phase positioning at the transmitter, according to an embodiment. The transmitter may perform a phase measurement at frequency f1 and a phase measurement at frequency $f_2$. The transmitter may derive the phase difference based on these two measurements and report the phase difference to the LMF.

At 402, the transmitter (e.g., the transmitting UE) determines an initial position of the receiver using a positioning technique, such as, for example, TDOA.

At 404, the transmitter indicates F-CPM capability to the LMF via higher layer signaling. During the capability exchange may be substantially identical to that described above with respect to 304 of FIG. 3. For example, the transmitter may indicate to the LMF whether it supports F-CPM. The transmitter may indicate to the LMF the maximum frequency difference it can support for the phase measurements. The transmitter may optionally report the phase measurement accuracy it can support to the LMF.

At 406, measurement configuration is received at the transmitter via higher layer signaling. RRC or LPP signaling may be used to indicate the measurement configuration. For carrier phase measurement with two tones, the measurement configuration message may include the two frequencies to be used for phase measurements. The measurement configuration message may also include the phase measurement accuracy if the transmitter can support multiple phase measurement precisions.

For measurement using a wideband RS, the message may include the frequency and time resource allocation for PRS and SRS and/or the phase measurement accuracy if transmitter can support multiple phase measurement precisions At 408, a measurement command is received at the transmitter via higher layer signaling. The measurement command may be received through RRC or LPP signaling with a configured measurement gap. A MAC CE may be used for measurement gap activation and deactivation for low latency.

At 410, the transmitter transmits an RS to a receiver at a first frequency f1, and the carrier phase is measured. At 412, the transmitter receives an RS from the receiver at a second frequency f2, and the carrier phase is measured. At 414, the transmitter measures a phase difference between the transmitted RS and the received RS.

At 416, the transmitter reports the phase difference to the LMF. The transmitter may report the measured phase difference and/or compute and report a distance between the transmitter and the receiver.

Figure 5:
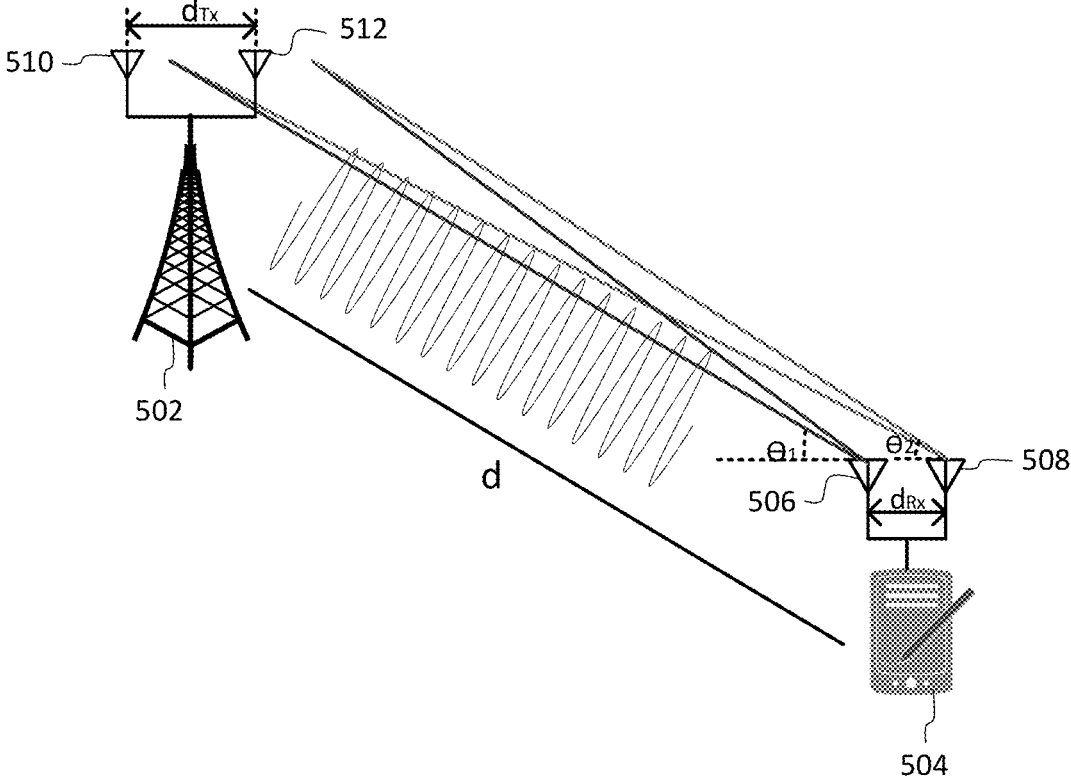
FIG. 5 is a diagram illustrating a system in which carrier phase measurement and angle of arrival (AoA)-based positioning are performed, according to an embodiment.

FIG. 5 is a diagram illustrating a system in which carrier phase measurement and AoA-based positioning are performed, according to an embodiment. A transmitter and a receiver are both equipped with multiple antennas. It is assumed that a distance between Rx antennas is $d_{Rx} < \lambda$, where $\lambda$ is the wavelength of a PRS. For an F-CPM with multiple Rx/Tx antennas, a receiver (e.g., a receiving UE) 504 first obtains an AoA at first Rx antenna 506 and second Rx antenna 508.

In order to obtain the AoA $\theta$, the receiver 504 first measures carrier phases of two received signals from a first Tx antenna 510 and a second Tx antenna 512 of a transmitter (e.g., gNB or transmitting UE) 502 to the first Rx antenna 506, $\varphi_1$ and $\varphi_2$. The receiver 504 then measures the phase difference $\psi_1 = \varphi_1 - \varphi_2$. The AoA of the received signal at the first Rx antenna 506, $\theta_1$ is given by Equation (9) below.

$$\theta_1 = \arccos\left(\frac{\psi_1 \lambda}{2\pi d_{Tx}}\right) \tag{9}$$

In Equation (9), $d_{Tx}$ is the distance between the first Tx antenna 510 and the second Tx antenna 512.

The receiver 504 then measures the carrier phases of the two received signals at the second Rx antenna 508, $\varphi_3$, $\varphi_4$, and the phase difference $\psi_2 = \varphi_3 - \varphi_4$. The AoA of the received signal at the second Rx antenna 508 is given by Equation (10) below.

$$\theta_2 = \arccos\left(\frac{\psi_2 \lambda}{2\pi d_{Tx}}\right) \tag{10}$$

The receiver 504 reports the two measured phase differences $\psi_1$ and $\psi_2$, and the carrier phase measurements from one Tx antenna to both Rx antennas (i.e., either $\varphi_1$ and $\varphi_2$ or $\varphi_3$ and $\varphi_4$).

In performing the phase measurements at the two Rx antennas 508 and 508, the two PRSs may be transmitted at the same time at two different frequencies, and the phase measurement may be performed in a frequency division multiplexing (FDM) manner.

Alternatively, the two PRSs may be transmitted at different time instances, and the phase measurement may be performed sequentially in a time division multiplexing (TDM) manner.

Assuming that the two AoAs of the signals at the first and second Rx antennas 506 and 508 are $\theta_1$ and $\theta_2$, and the distance between the transmitter 502 and the receiver 504 is denoted as d, Equation (11) is obtained as set forth below.

$$\begin{cases} 2N_1\pi + \varphi_1 = d\dfrac{\psi_1}{d_{Tx}} \\ 2N_2\pi + \varphi_2 = d\dfrac{\psi_2}{d_{Tx}} \end{cases} \tag{11}$$

When the distance between the first and second Rx antennas 506 and 508 is smaller than one wavelength (i.e., $d_{Rx} < \lambda$), integer ambiguity in the above equations satisfies $N_1 = N_2 = N$. With the known phase measurements $\varphi_1$ and $\varphi_2$, the unknown parameters d and N can be resolved by solving Equation (11).

Thus, according to an embodiment, for an F-CPM method with multiple antennas, both the transmitter and the receiver may be equipped with at least two antennas. The PRS/SRS can be reused as the reference signal for carrier phase measurement. An initial location is established (e.g., using downlink (DL) TDOA or multi-RTT methods), and may be used for UE calibration for mitigating the phase offset in the carrier phase measurements. The UE may measure and report, to an LMF, the carrier phase difference of the reference signals from one Tx antenna to two Rx antennas. The reporting format may be one set of reference values and the difference between the phase measurements and the reference values. The UE may report the difference between the current phase measurements and the previous values (or the reference values) to update the report of the phase measurements. The UE location may be tracked by using both angle and distance (obtained from the phase measurement).

In an alternate embodiment, F-CPM may be performed with multiple antennas, and the receiver may perform positioning using F-CPM and measurements at a single frequency. In capability exchange, the receiver may only indicate that it can perform AoA measurements. Additionally, the UE may measure the two carrier phases at two receive antennas and the phase difference between them, and then report the measurement to the LMF.

According to an embodiment, carrier phase positioning may be used in conjunction with other positioning methods. Phase is proportional to distance, and after a propagation distance of d, phase variation is noted in Equation (12) below.

$$\Delta\varphi = 2\pi^d/\lambda \qquad (12)$$

In Equation (12), λ is the wavelength. However, since the electromagnetic waves propagate as sine waves, a receiver may only measure $e^{j\Delta\delta}$. Accordingly, there is an ambiguity in the phase determination since any $2\pi$ rotation will be undetected.

The UE may perform (re)-calibration at various times to ensure that high positioning accuracy can be obtained. In order to limit the number of recalibrations, with each carrier-phase measurement, the UE may provide an indication of the quality of the measurement.

In indicating carrier phase measurement capability, the indicator may include a maximum time interval during which the carrier phase calibration can be assumed to be valid. The indicator may also include a rate of phase change depending on time and/or an estimation accuracy of the UE location given by other positioning methods. These values may be used by the gNB to determine how often it will need to provide recalibration.

After performing phase measurements based on received RSs, the UE may determine measurement accuracy. Based on its own characteristics, the UE determines how accurate its carrier phase positioning measurement is. For example, this determination may be based on the drift rate of the UE clock and/or the last time calibrating was performed.

The UE may report the carrier phase measurement along with the determined accuracy. In certain embodiments, reporting the accuracy may not be required because the gNB may perform the accuracy evaluation itself based on the UE capability exchange described in detail above. However, it may be more beneficial for the UE send the accuracy with the measurement because the UE may be able to obtain its location through UE-based positioning and may have recalibrated itself. The UE may also have had access to global navigation satellite system (GNSS) and obtained its location with GNSS (the carrier phase positioning can be viewed as an extension of differential GNSS for in-building cases). The UE may have recalibrated itself through other means (e.g., positioning on the sidelink).

The UE may report a '0' or '1', with '0' indicating that the measurement is coarse and that the UE needs to recalibrate. In another embodiment, the UE may send an unsolicited message requesting calibration.

In an alternate embodiment, the RSs used to determine carrier phase variations may also be used to perform other measurements. In such a case, the UE may autonomously decide which technique to use based on its own calibration status, and reports which technique it used in the report measurement step.

Figure 6:
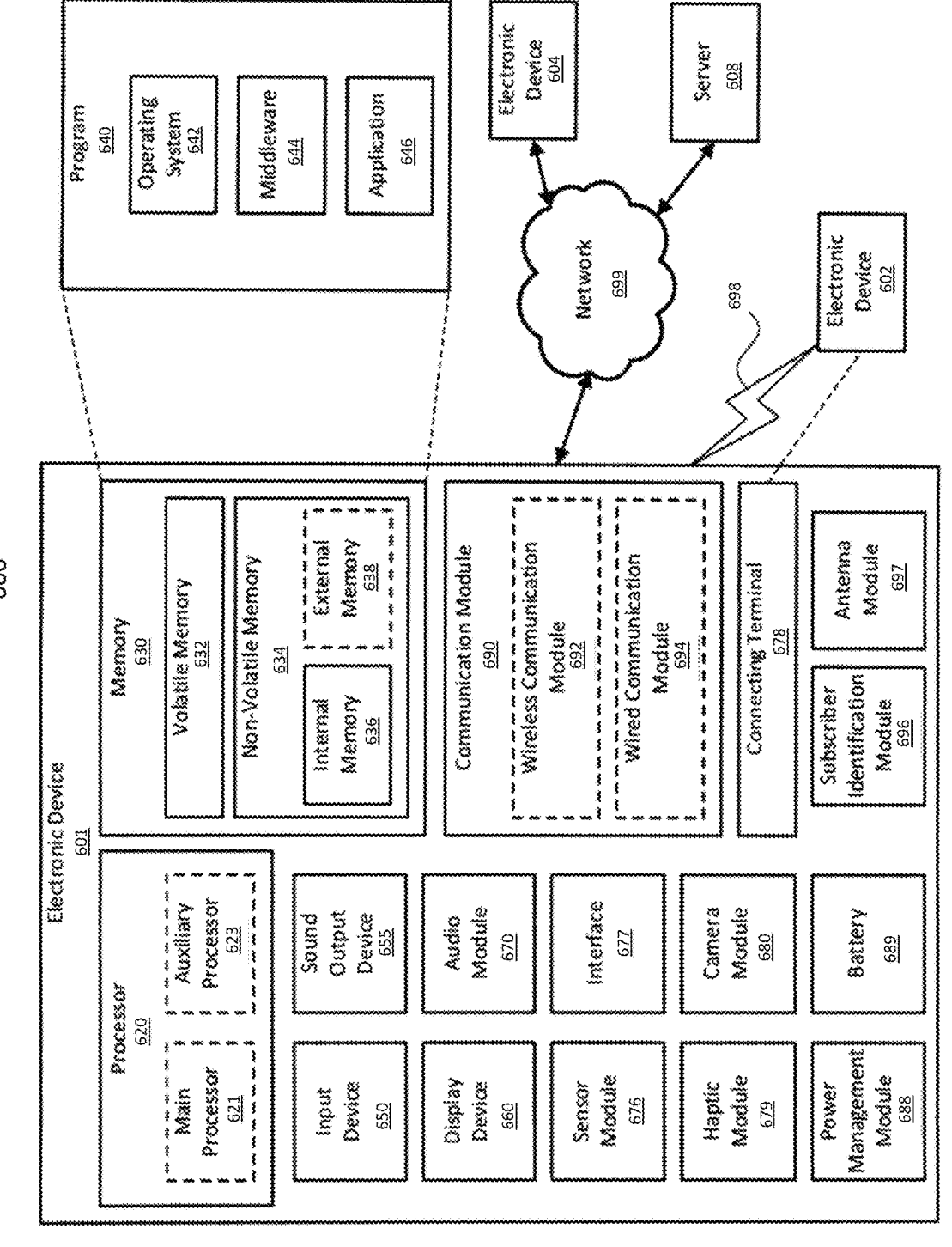
FIG. 6 is a block diagram of an electronic device in a network environment, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may be embodied as the transmitting or receiving UE described above, and is in communication with the electronic device 604 or the server 608, which may be embodied as the gNB or corresponding UE.

The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high- definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

transmitting, by a user equipment (UE) in a network, to a location management function (LMF) of the network, an indication of a maximum frequency difference between reference signals that the UE supports for a frequency-based carrier phase measurement (F-CPM), measuring, by the UE, a first carrier phase based on a first reference signal at a first frequency, and a second carrier phase based on a second reference signal at a second frequency that is different from the first frequency;

performing a measurement, by the UE, based on the first carrier phase and the second carrier phase; and reporting, from the UE, the measurement to the LMF.

2. The method of claim 1, further comprising:

determining an initial position of the UE using a positioning technique;

determining an integer ambiguity at the initial position of the UE; and determining a position of the UE in which the integer ambiguity is resolved using the measurement.

3. The method of claim 1, wherein the UE further transmits at least one of UE ability to support F-CPM, a carrier phase measurement method supported by the UE, or a carrier phase measurement accuracy supported by the UE to the LMF.

4. The method of claim 1, further comprising:

receiving, by the UE, via higher layer signaling, a measurement configuration indicating the first and second frequencies of the first and second reference signals; and receiving, by the UE, via higher layer signaling, a measurement command to perform the measurement based on the first carrier phase and the second carrier phase.

5. The method of claim 1, further comprising:

receiving, by the UE, the first and second reference signals.

6. The method of claim 1, wherein the first and second reference signals are positioning reference signals or sounding reference signals.

7. The method of claim 1, further comprising:

transmitting, by the UE, the first reference signal at the first frequency; and receiving, by the UE, the second reference signal at the second frequency.

8. The method of claim 1, wherein a resource allocation of a carrier phase reference signal in the first and second reference signals occupies a single resource element in the frequency domain and continuous symbols in the time domain.

9. The method of claim 1, wherein the UE comprises first and second receive antennas, and further comprising:

determining a position of the UE based on angles of arrival of the first and second reference signals at the first and second receive antennas.

10. A user equipment (UE) in a network, the UE comprising:

a processor; and a non-transitory computer readable storage medium storing instructions that, when executed, cause the processor to:

transmit, to a location management function (LMF) of the network, an indication of a maximum frequency difference between reference signals that the UE supports for a frequency-based carrier phase measurement (F-CPM), measure a first carrier phase based on a first reference signal at a first frequency, and a second carrier phase based on a second reference signal at a second frequency that is different from the first frequency;

perform a measurement based on the first carrier phase and the second carrier phase; and report the measurement to the LMF.

11. The UE of claim 10, wherein the instructions further cause the processor to:

determine an initial position of the UE using a positioning technique;

determine an integer ambiguity at the initial position of the UE; and determine a position of the UE in which the integer ambiguity is resolved using the measurement.

12. The UE of claim 10, wherein the instructions further cause the processor to:

further transmit at least one of UE ability to support F-CPM, a carrier phase measurement method supported by the UE, or a carrier phase measurement accuracy supported by the UE to the LMF.

13. The UE of claim 10, wherein the instructions further cause the processor to:

receive, via higher layer signaling, a measurement configuration indicating the first and second frequencies of the first and second reference signals; and receive, via higher layer signaling, a measurement command to perform the measuring of the measurement based on the first carrier phase and the second carrier phase.

14. The UE of claim 10, wherein the instructions further cause the processor to:

receive the first and second reference signals.

15. The UE of claim 10, wherein the first and second reference signals are positioning reference signals or sounding reference signals.

16. The UE of claim 10, wherein the instructions further cause the processor to:

transmit the first reference signal at the first frequency; and receive the second reference signal at the second frequency.

17. The UE of claim 10, wherein a resource allocation of a carrier phase reference signal in the first and second reference signals occupies a single resource element in the frequency domain and continuous symbols in the time domain.

18. The UE of claim 10, wherein the UE comprises first and second receive antennas, and further comprising:

determining a position of the UE based on angles of arrival of the first and second reference signals at the first and second receive antennas.

19. A system comprising:

a user equipment (UE) configured to transmit to a location management function (LMF) an indication of a maximum frequency difference between reference signals that the UE supports for carrier phase measurements, perform a measurement based on carrier phases from reference signals at different frequencies, and report the measurement; and the LMF configured to receive the measurement and determine a location of the UE.

* * * * *